Nov. 26, 1957   O. K. KELLEY   2,814,214
TRANSMISSION
Filed Nov. 22, 1955
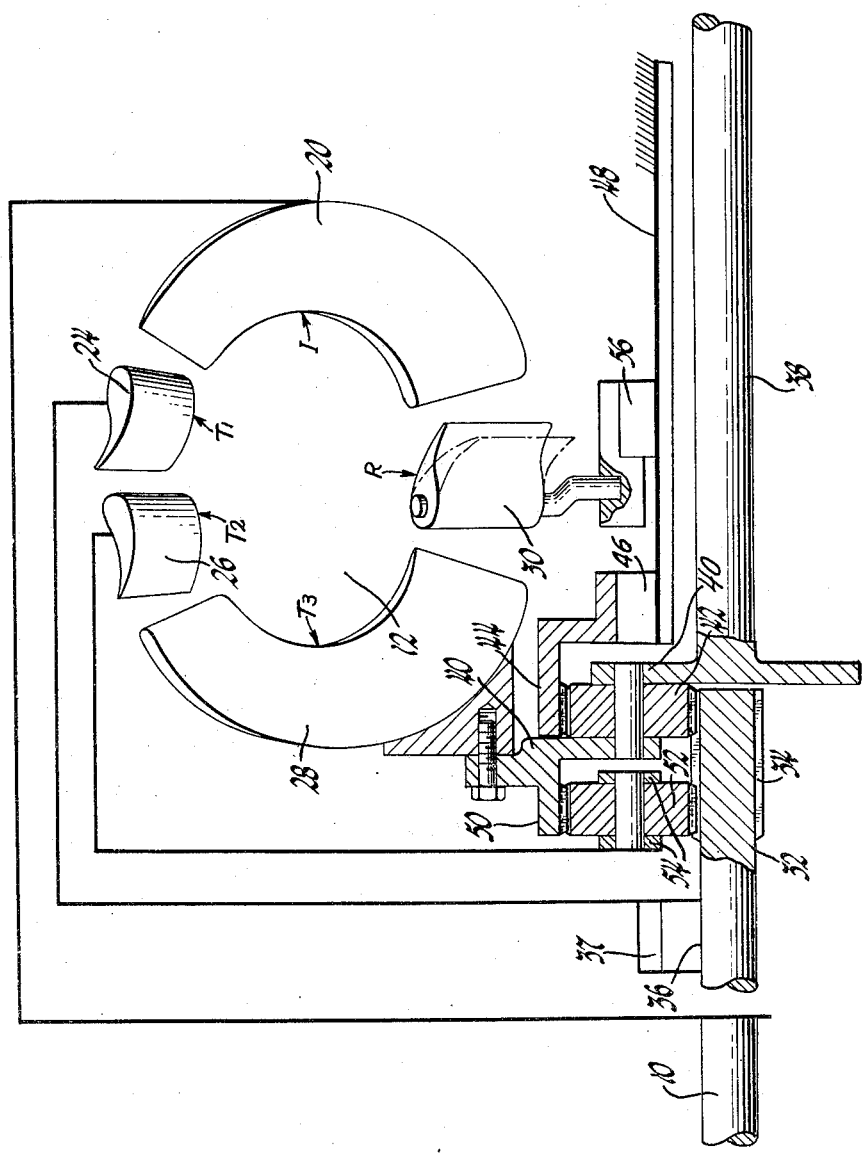
INVENTOR
Oliver K. Kelley
BY
T. L. Chisholm
ATTORNEY

United States Patent Office 2,814,214
Patented Nov. 26, 1957

2,814,214

TRANSMISSION

Oliver K. Kelley, Bloomfield Hills, Mich., assignor to General Motors Corporation, Detroit, Mich., a corporation of Delaware Application November 22, 1955, Serial No. 548,455

7 Claims. (Cl. 74—677)

This invention relates to improvements in arrangements of hydrodynamic torque transfer and/or multiplying devices and associated gearing for driving a power output member at various speed ratios from a power input member. These are particularly, although not exclusively, suited to motor vehicle transmissions, and such a transmission is described herein as one example of a device to which my invention may be applied. Also, the invention is especially, but not exclusively, adapted to hydrodynamic torque converters or speed reducers which multiply torque.

In hydrodynamic torque converters a turbine can readily be constructed to provide any practical degree of torque multiplication on starting, but if the degree of starting torque multiplication is sufficiently high, the torque supplied by the turbine decreases rapidly as the turbine starts to turn, and vanishes at an impractically low turbine speed. This provides poor acceleration and may furnish little or no torque as the device approaches coupling or one-to-one speed ratio. On the other hand, a turbine can be constructed to provide acceptable coupling characteristics if or when the load reaches approximate impeller speed, but this is done at a sacrifice of starting or stall torque and accelerating torque in the middle ranges of speed.

The foregoing considerations have led to the design and construction of hydrodynamic torque transfer devices, especially torque converters having various arrangements of multiple turbines of varying torque characteristics with or without torque multiplying gearing. Many of those proposed or constructed operate satisfactorily within inherent limitations which it has heretofore been impractical to avoid, and their disadvantages include inadequate maintaining of torque multiplication during intermediate speed ranges, and the impossibility of obtaining adequate torque multiplication in these ranges. These have produced cars which have been sluggish in performance after starting and cars in which it has been impractical to obtain a so-called passing gear, by which is meant the ability to provide a spurt of high acceleration when running at moderate or high speed. Such known devices frequently have been of low efficiency requiring high operating costs.

My invention seeks to overcome these and other disadvantages of known hydrodynamic transmissions and to provide a transmission which changes torque ratio smoothly and continuously, that is by infinitely small increments without shifting of mechanical torque multiplying devices such as gears. It seeks to improve the efficiency of torque converters and to provide a hydrodynamic torque converter which has a high starting torque ratio, and maintains a higher torque ratio than was formerly had during acceleration to one-to-one drive. The invention also seeks to provide improved and simplified means for increasing the torque ratio at any speed, manually or automatically in response to torque demand on the engine, or both.

Any torque converter turbine has the inherent characteristic of providing diminishing torque multilication as the turbine speed increases toward impeller speed, as long as the turbine is operating alone, by which I mean that there is no other turbine ahead of the turbine in question in the liquid stream from the impeller, which other turbine is delivering torque. I combine a series of such turbines, of different torque characteristics, in such a way that as the torque multiplication or torque ratio of one turbine decreases the torque multiplications of downstream turbines increase. By providing a sufficient number of such turbines, while the turbines of the series are successively fading out, that is their torque multiplications are decreasing toward zero, the downstream turbines are increasing their torque ratios so that the torque ratio of the torque converter as a whole decreases toward coupling much more slowly than heretofore, and stays at practically high values over long periods of acceleration of the vehicle. This provides a maneuverable vehicle of high performance, which is very desirable in present day driving conditions.

Preferably, I combine a series of axial flow turbines with a radial inflow turbine and connect each turbine to an output shaft, the connection of the final or radial inflow turbine being direct and the connections of all the other turbines being free-wheeling. In this way during acceleration of the car each turbine runs faster than the next turbine downstream, and as each turbine, except the last, approaches its terminal speed and its torque consequently vanishes, that turbine is disconnected from the output shaft, and is free to float or turn idly in the oil stream, neither putting out torque nor taking up any significant amount. For all practical purposes, except for factors such as friction losses each free-wheeling turbine may be considered as removed from the transmission.

The invention also includes improved arrangements of gearing especially helpful in achieving the foregoing objects.

The foregoing and other objects and advantages of the invention will be apparent from the annexed description and from the accompanying drawing.

The single figure of the drawing is schematic and represents half of a symmetrical longitudinal section of a transmission embodying one form of the invention.

Referring to the drawing the transmission includes an input shaft 10 driving a hydrodynamic torque converter 12 which may be of the construction and arrangement of the torque converter shown in my application S. N. 537,472, filed September 29, 1955, the disclosure of which is incorporated herein by reference.

The torque converter includes a pump or impeller I of generally known form, represented diagrammatically in the drawing by a single blade 20, rotated by the input shaft 10 and circulating working liquid such as oil in a closed toroidal path through a series of turbines and a reaction member as is known.

In my invention I include a first turbine $T_1$ represented by a single blade 24, a second turbine $T_2$, represented by blade 25, a third turbine $T_3$, represented by blade 28 and a reaction member R, represented by blade 30. The liquid from the pump I flows successively through $T_1$, $T_2$, $T_3$ and R.

The first turbine $T_1$ drives a shaft 32 which is fixed to a long input sun gear 34. The drive is through any suitable one way drive connection 36 between shaft 32 and the flange 37 connected to $T_1$ which permits shaft 32 to rotate forward faster than flange 37, but never slower.

The output shaft 38 is connected to a carrier 40 which supports planetary pinions 42 meshing both with sun gear 34 and with a reaction ring gear 44 which is prevented from rotating backward and permitted to rotate forward by any suitable one-way brake 46 engaging a ground sleeve 48 fixed to the frame of the transmission. Turbine $T_1$ thus constitutes an input means for rotating the output shaft forward at reduced speed.

The carrier 40 is connected to a second ring gear 50 which meshes with a second set of planetary pinions 52, also meshing with the input sun gear 32 and mounted on a second carrier 54 connected to $T_2$. Rotation of $T_2$ rotates the second carrier forward, and if resistance is offered by the output shaft, this tends to rotate forward both the second ring gear 50 and sun gear 34. The tendency of sun gear 34 to rotate forward tends to rotate backward the first ring gear 44 and to lock, or hold locked, the brake 46. Thus the first ring gear now acts as reaction member for the planetary pinions 52, so that the ring gear 50, carrier 40 and output shaft 38 are all driven forward by $T_2$ which is a second input means for driving the output shaft through the gearing.

The third turbine $T_3$ is connected to second ring gear 50 and to the first carrier 40 and thus directly to the output shaft 38. The third turbine is thus a third input means for driving the output shaft.

If desired the stator R is one way braked to the ground sleeve against reverse rotation by the brake 56, as is customary.

Each turbine is of a form as known in the art which inherently provides a high torque multiplication when the turbine is stationary or moving slowly with respect to the impeller and whose ratio or torque multiplication decreases as the speed of the turbine increases with respect to the speed of the impeller. This is the condition obtaining when each turbine acts alone and independently of other turbines between it and the impeller. For example, it would be the condition in a torque converter having the impeller, stator and only the particular turbine under consideration. As explained in my application referred to, the torque characteristic of the first turbine is inherently of this type and starts at a maximum torque multiplication at stall (that is when the turbine is stationary and the impeller is rotating at operating speed) and the torque multiplication decreases with increasing turbine speed until the torque vanishes and at the terminal speed of the turbine. The second turbine if acting alone would have a similar torque characteristic, but since the second turbine receives its liquid from the first turbine which influences the direction at which the liquid strikes the second turbine, the second turbine will have a torque characteristic which is low at stall and increases as the torque of the first turbine decreases, the torque multiplication of the second turbine reaching a maximum at the point where the torque of the first turbine vanishes. Thereafter as the speed of the second turbine increases, its torque follows the customary characteristic of decreasing gradually with increasing speed. The first turbine providing no torque, is floating in the oil stream and is not affecting the direction of liquid leaving the pump and striking the second turbine. Likewise, the third turbine if acting alone would provide a torque characteristic of the conventional form but since this turbine receives its oil from the second turbine, which affects the direction at which the oil impinges on the third turbine, the third turbine torque will be low at stall, it will rise to a maximum value at the point where the torque of the second turbine vanishes and thereafter the torque exerted by the third turbine may gradually decrease with increased speed for a time, but in any event will eventually remain substantially constant in the condition of coupling as is well known and as explained in detail in my application, referred to.

The apparatus described operates as follows: Assume that the input shaft 10 is driven by the engine of an automobile and that the output shaft 38 is connected to the driving wheels and the car is stationary with the engine idling. When the engine speed is increased the impeller will circulate oil through the turbine blades to provide torque on the various blades for driving the car in the known manner. Initially with output shaft 38 at rest the oil from the impeller striking the first turbine $T_1$ exerts high torque on that turbine as explained above. The turbine begins to turn, driving the sun gear 32 which sets the reaction brake 46 and so rotates the carrier 40 forward to drive the output shaft forward at reduced speed. Under the conditions supposed the oil may exert little or no forward torque on the $T_2$ blades 26, nor on the $T_3$ blades 30 but these turbines are positively rotated by the first turbine through the gearing. The third turbine $T_3$ is positively driven at the speed of the output shaft because it is connected to the carrier 40, and since the sun gear 32 and the carrier 40 and with it the ring gear 50 are rotating forward, the carrier 54 and the second turbine $T_2$ will be rotated forward. As the torque exerted by the first turbine decreases, the torque exerted by the second turbine increases, as explained above, and at some point the torque of the first turbine vanishes and the torque of the second turbine becomes a maximum. When this occurs the second turbine $T_2$ will be driving the carrier 54 faster than the carrier tends to be driven by the sun gear 32 and ring gear 50, the shaft 32 will run forward away from the flange 37, the freewheeler 36 will break away and the second turbine will be driving the car, leaving the first turbine idling or rotating freely in the oil stream without absorbing or delivering any appreciable amount of torque.

During this condition the third turbine $T_3$ may or may not be delivering forward torque received from the oil in the working circuit, but whether or not it is the third turbine cannot avoid turning forward with the output shaft. As the speed of the output shaft continues to increase the torque of the second turbine will decrease while the torque of the third turbine is increasing and eventually a point will be reached where the third turbine takes over the drive of the car and lets the second turbine free wheel, floating idly in the oil stream as was the case with the first turbine. When this occurs, the freewheeler 46 breaks away and the car is being driven exclusively by the third turbine $T_3$ through the direct connection to the output shaft to the carrier 40.

The design of the blades and their construction and angular arrangement, and the controls therefore may be as shown in detail in my application referred to, so that the torque transmitting characteristics may be as represented by the appropriate curves in Fig. 14 of that application. The blades of $T_2$ can be made either adjustable, as shown in that application, or may be fixed at any desired angle, such as either the low performance angle or high performance angle disclosed.

It is contemplated that the output shaft 38 may be connected to the drive wheels of the car through any suitable known reversing gear.

I claim:

1. A transmission comprising in combination an input sun gear, a first ring gear, planetary gears meshing with the sun and ring gears and mounted on a carrier adapted to be connected to an output shaft, means for preventing reverse rotation while permitting forward rotation of the ring gear, first input means for rotating the sun gear forward to drive the output shaft forward, a second ring gear connected to the carrier, planetary gears meshing with the second ring gear and with said sun gear and mounted on a second carrier, second input means for rotating the second carrier forward to drive the output shaft, and third input means for rotating the second ring gear forward to drive the output shaft.

2. A transmission comprising in combination an input sun gear, a first ring gear, planetary gears meshing with the sun and ring gears and mounted on a carrier adapted to be connected to an output shaft, means for preventing reverse rotation while permitting forward rotation of the ring gear, first input means for rotating the sun gear forward through a one-way drive connection to drive the output shaft forward, a second ring gear connected to the carrier, planetary gears meshing with the second ring gear and with said sun gear and mounted on a second carrier, second input means for rotating the second carrier forward to drive the output shaft, and third input means for rotating the second ring gear forward to drive the output shaft.

3. A transmission comprising in combination a first planetary input gear, a first planetary reaction gear, planetary pinions meshing with the input and reaction gears and mounted on a carrier adapted to be connected to an output shaft, means for preventing reverse rotation while permitting forward rotation of the reaction gear, a first input means for rotating the input gear forward to rotate the output shaft forward, a second planetary input gear connected to the carrier, planetary gears meshing with both said input gears and mounted on a second carrier, second input means for rotating the second carrier forward to drive the output shaft, and third input means for rotating the output shaft forward.

4. A transmission comprising in combination a first planetary input gear, a first planetary reaction gear, planetary pinions meshing with the input and reaction gears and mounted on a carrier adapted to be connected to an output shaft, means for preventing reverse rotation while permitting forward rotation of the reaction gear, a first input means for rotating the input gear forward through a one-way drive connection to rotate the output shaft forward, a second planetary input gear connected to the carrier, planetary gears meshing with both said input gears and mounted on a second carrier, second input means for rotating the second carrier forward to drive the output shaft, and third input means for rotating the output shaft forward.

5. A transmission comprising in combination a hydrodynamic torque transfer device including an impeller for circulating liquid in a toroidal path, an input sun gear, a first ring gear, planetary gears meshing with the sun and ring gears and mounted on a carrier adapted to be connected to an output shaft, means for preventing reverse rotation while permitting forward rotation of the ring gear, a first turbine in the path of liquid circulated by the impeller connected to the sun gear, a second ring gear connected to the carrier, planetary pinions engaging the sun and second ring gears and mounted on a second carrier, a second turbine in the path of the liquid connected to the second carrier, and a third turbine in the path of the liquid connected to the output shaft.

6. A transmission comprising in combination a hydrodynamic torque transfer device including an impeller for circulating liquid in a toroidal path, an input sun gear, a first ring gear, planetary gears meshing with the sun and ring gears and mounted on a carrier adapted to be connected to an output shaft, means for preventing reverse rotation while permitting forward rotation of the ring gear, a first turbine in the path of liquid circulated by the impeller connected through a one-way driving connection to the sun gear, a second ring gear connected to the carrier, planetary pinions engaging the sun and second ring gears and mounted on a second carrier, a second turbine in the path of the liquid connected to the second carrier, and a third turbine in the path of the liquid connected to the output shaft.

7. A transmission comprising in combination a hydrodynamic torque transfer device including an impeller for circulating liquid in a toroidal path, an input sun gear, a first ring gear, planetary gears meshing with the sun and ring gears and mounted on a carrier adapted to be connected to an output shaft, means for preventing reverse rotation while permitting forward rotation of the ring gear, a first turbine in the path of liquid circulated by the impeller connected to the sun gear, a second ring gear connected to the carrier, planetary pinions engaging the sun and second ring gears and mounted on a second carrier, a second turbine receiving liquid from the first turbine and connected to the second carrier, and a third turbine receiving liquid from the second turbine and connected to the output shaft.

No references cited.